United States Patent
Critchley et al.

(10) Patent No.: US 7,921,216 B2
(45) Date of Patent: Apr. 5, 2011

(54) SYSTEM AND METHOD FOR BUILDING AND USING COMMUNICATION BINDING OBJECTS

(75) Inventors: Craig A. Critchley, Fall City, WA (US); David A. Wortendyke, Seattle, WA (US); Elliot L. Waingold, Seattle, WA (US); Eric K. Zinda, Seattle, WA (US); Erik B. Christensen, Seattle, WA (US); Giovanni M. Della-Libera, Seattle, WA (US); Kenneth D. Wolf, Seattle, WA (US); Michael S. Vernal, Seattle, WA (US); Shy Cohen, Bellevue, WA (US); Stefan H. Pharies, Seattle, WA (US); Stephen J. Millet, Edmonds, WA (US); Stephen T. Swartz, Seattle, WA (US); Tomasz Janczuk, Redmond, WA (US); Uday S. Hegde, Bellevue, WA (US); Yaniv Pessach, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1367 days.

(21) Appl. No.: 11/048,346

(22) Filed: Feb. 1, 2005

(65) Prior Publication Data

US 2006/0174016 A1    Aug. 3, 2006

(51) Int. Cl.
*G06F 15/16* (2006.01)
(52) U.S. Cl. ......... 709/228; 709/227; 715/735; 717/109
(58) Field of Classification Search .......... 709/220–221, 709/227–228, 230; 719/313; 715/734–736; 717/104–105, 109, 113, 120
See application file for complete search history.

(56) References Cited

U.S. PATENT DOCUMENTS

| 5,323,388 A | * | 6/1994 | Chang et al. | ................... 370/353 |
| 5,809,507 A | * | 9/1998 | Cavanaugh, III | ......... 707/103 R |

(Continued)

FOREIGN PATENT DOCUMENTS

WO    WO 2004/055693    7/2004

(Continued)

OTHER PUBLICATIONS

Mukhi, Nirmal; Cooperatve Middleware Specialization for Service Oriented Architectures; May 2004, ACM, p. 206-215.*

(Continued)

*Primary Examiner* — Rupal D Dharia
*Assistant Examiner* — Jimmy H Tran
(74) *Attorney, Agent, or Firm* — Workman Nydegger

(57) ABSTRACT

The present invention provides for an automated, user friendly way of constructing and using a binding object. A developer is presented with and selects binding elements that will ultimately be used to create a runtime communication channel for transporting a message between a client and service endpoint. After receiving the user input, metadata, a channel factory and listener factory are created. The metadata describes binding elements and provides an abstract representation of a protocol stack that implements communication aspects at runtime. The channel factory is configured to use the collection of metadata at runtime to generate the runtime communication channel. Further, the listener factory is configured to accept the runtime communication channel for de-multiplexing the communication aspects in order to process the message at a service endpoint. The present invention also provides for groupings of binding elements and standardized binding objects organized based on industry need.

9 Claims, 9 Drawing Sheets

U.S. PATENT DOCUMENTS

| | | | |
|---|---|---|---|
| 5,860,004 A * | 1/1999 | Fowlow et al. | 717/109 |
| 5,903,754 A * | 5/1999 | Pearson | 719/310 |
| 5,920,868 A * | 7/1999 | Fowlow et al. | 707/103 R |
| 5,949,998 A * | 9/1999 | Fowlow et al. | 717/105 |
| 5,991,535 A * | 11/1999 | Fowlow et al. | 717/107 |
| 6,032,199 A * | 2/2000 | Lim et al. | 719/316 |
| 6,044,224 A * | 3/2000 | Radia et al. | 717/162 |
| 6,044,409 A * | 3/2000 | Lim et al. | 719/315 |
| 6,189,138 B1 * | 2/2001 | Fowlow et al. | 717/107 |
| 6,230,161 B1 * | 5/2001 | Berkland et al. | 707/103 R |
| 7,489,707 B2 * | 2/2009 | Pung et al. | 370/469 |
| 7,499,967 B2 * | 3/2009 | Hulse et al. | 709/203 |
| 7,539,609 B2 * | 5/2009 | Lenz et al. | 703/27 |
| 2001/0015984 A1 * | 8/2001 | Lenz et al. | 370/469 |
| 2002/0184373 A1 * | 12/2002 | Maes | 709/228 |
| 2003/0174731 A1 * | 9/2003 | Tafazolli et al. | 370/469 |
| 2003/0204645 A1 * | 10/2003 | Sharma et al. | 709/328 |
| 2004/0139151 A1 * | 7/2004 | Flurry et al. | 709/203 |
| 2004/0139322 A1 * | 7/2004 | Kaler et al. | 713/170 |
| 2005/0050549 A1 * | 3/2005 | Joseph et al. | 719/313 |
| 2005/0228864 A1 * | 10/2005 | Robertson | 709/206 |
| 2005/0238050 A1 * | 10/2005 | Pung et al. | 370/469 |
| 2006/0085687 A1 * | 4/2006 | Cheng | 714/38 |

FOREIGN PATENT DOCUMENTS

| | | |
|---|---|---|
| WO | WO 2004/090750 | 10/2004 |

OTHER PUBLICATIONS

Mukhi, Nirmal K. et al. "Cooperative Middleware Specialization for Service Oriented Architectures", Proceedings of the 13th International World Wide Web Conference, May 17-22, 2004, New York, NY.

Curbera, F. et al. "Metadata-Driven Middleware for Web Services", Web Information Systems Engineering, 2003., Proceedings of the Fourth International Conference on Dec. 10-12, 2003, Piscataway, NJ.

Mukhi, N. et al. "Multi-Protocol Web Services for enterprises and the Grid", Euroweb, The Web and the Grid, from E-Science to E-Business, Dec. 18, 2002.

* cited by examiner

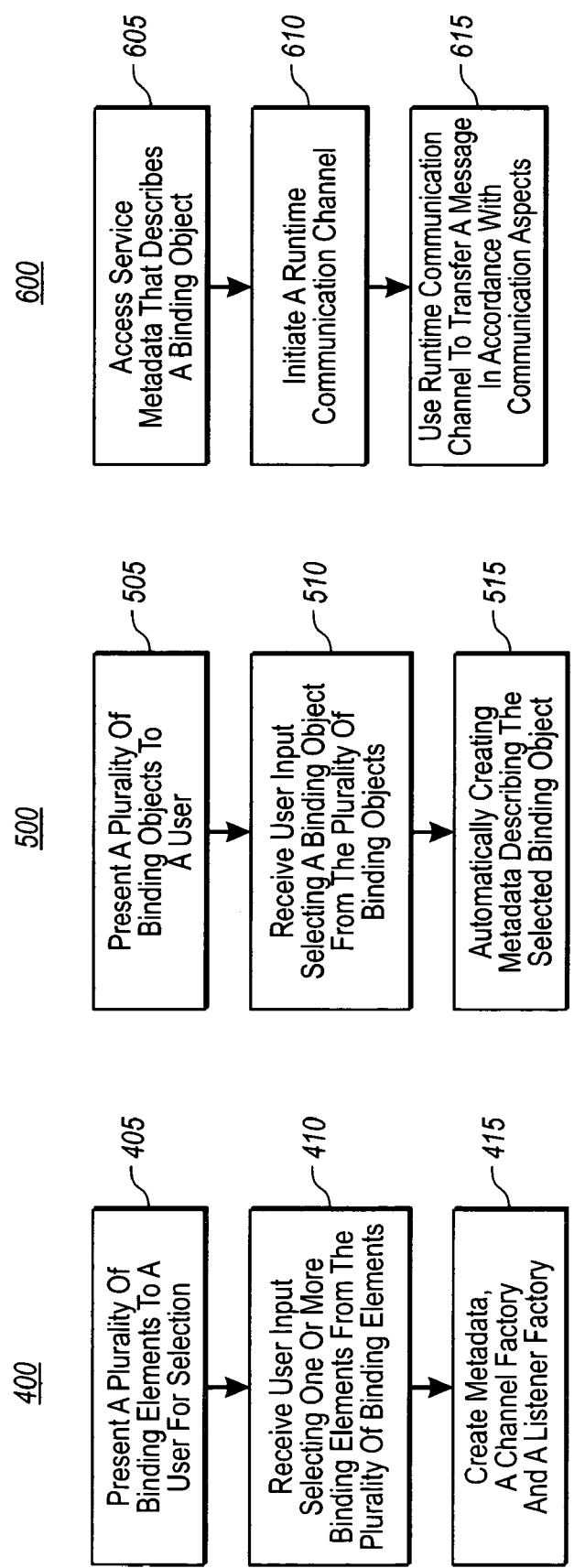

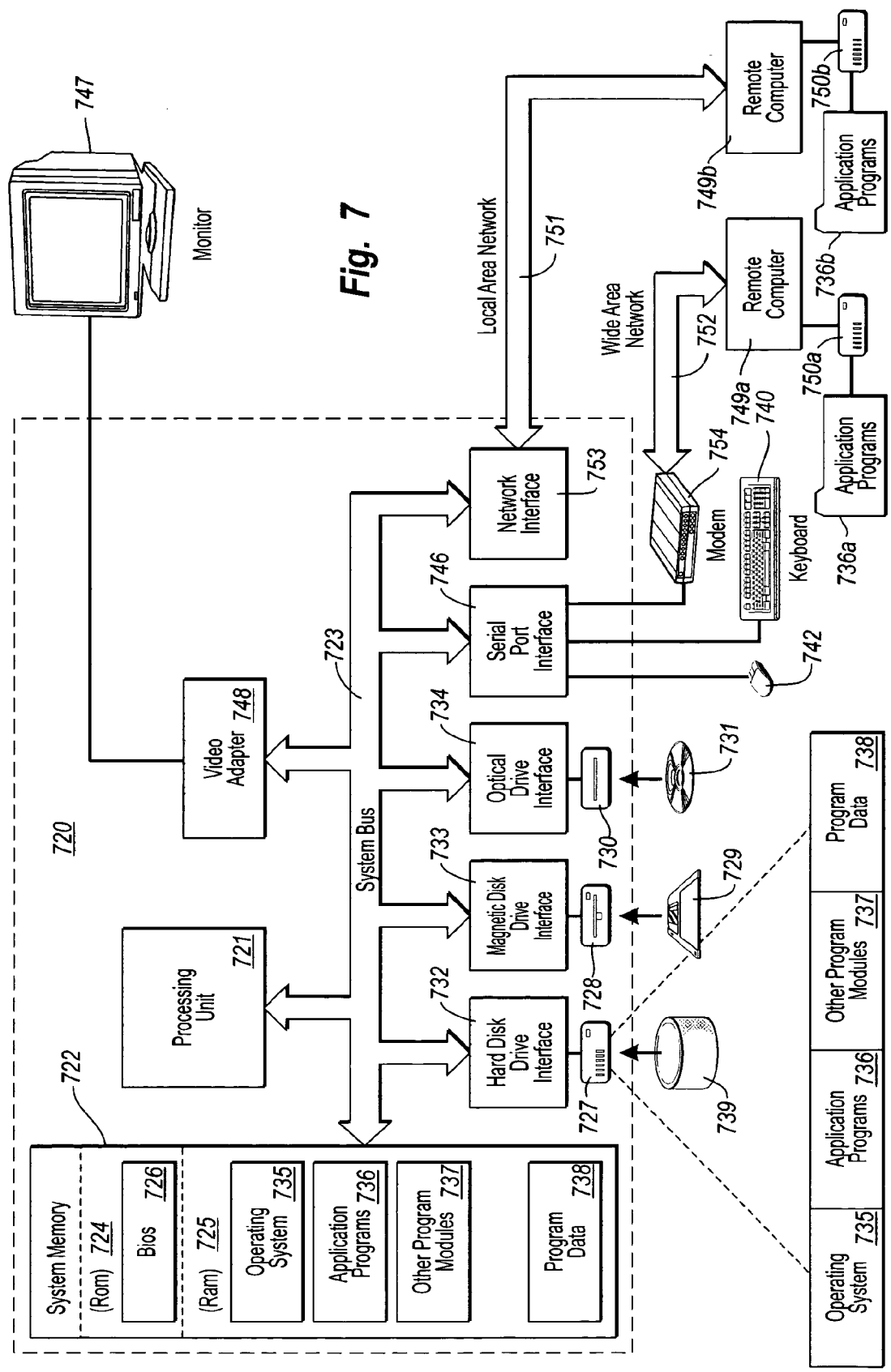

SYSTEM AND METHOD FOR BUILDING AND USING COMMUNICATION BINDING OBJECTS

CROSS-REFERENCE TO RELATED APPLICATIONS

N/A

BACKGROUND OF THE INVENTION

1. The Field of the Invention

The present invention is generally related to binding messages to communication aspects in a distributed system. More specifically, the present invention provides a developer with an automated, user friendly way of constructing binding objects that can be used to create a runtime communication channel in order to apply communication aspects to messages when transferring them between endpoints.

2. Background and Related Art

Computer systems and related technology affect many aspects of society. Indeed, the computer system's ability to process information has transformed the way we live and work. Computer systems now commonly perform a host of tasks (e.g., word processing, scheduling, database management, etc.) that prior to the advent of computer systems were performed manually. More recently, computer systems have been coupled to one another to form computer networks over which the computer systems can communicate electronically to share data. Service oriented systems (e.g., Web Services) have been a driving force in advancing such communications between computer systems and is turning the way we build and use software inside-out.

Service oriented architectures let applications share data, and—more powerfully—invoke capabilities from other applications without regard to how those applications were built, what operating system or platform they run on, and what devices are used to access them. Typically, these systems are invoked over the Internet by means of industry-standard protocols including SOAP (Simple Object Access Protocol), XML (extensible Markup Language), UDDI (Universal Description Discovery Integration), WSDL (Web Service Description Language), etc. Although these services remain independent of each other, they can loosely link themselves into a collaborating group that performs a particular task.

Often, electronic communication in a service oriented network includes a client computer system (hereafter referred to as a "client") requesting access to a network service(s) (e.g., Web Services) at a server computer system (hereinafter referred to as a "service"). Accordingly, the client sends a request to the service for particular access to its system resources, wherein if the client is authorized and validated, the service responds, e.g., with a response message providing the desired information. Of course, other message exchange patterns between a client and a service are available and include simple singleton messages as well as more sophisticated multi-message exchanges like, e.g., notifications, solicit-response, pub-sub patterns, polling, kick-push, queuing and others.

Service oriented concepts (e.g., addresses, bindings, and message interaction patterns) describing a service can be included in a programming model. The programming model can then be accessed by service consumers that desire to communicate with the described service. Generally, service oriented concepts (e.g., a programming model) are described in accordance with some service oriented standard, such as, for example, Distributed Component Object Model ("DCOM"), Common Object Request Broker Architecture ("CORBA"), or Web services. Web services can be further defined in accordance with various Web services specifications, such as, for example, Web Services Description Language ("WSDL"), Web Services Policy Framework ("WS-Policy"), etc.

Service oriented standards like WSDL provide an overall wrapper or specification for describing contracts (e.g., WS contracts) in a common or standard language. Such specifications make it easy for developers and developer tools to create and interpret contracts. Although such Network Protocol Description Languages (hereinafter referred to as "NPDL") have extensive tooling suites, which in large part accounts for their popularity, there are currently several shortcomings and downfalls to such standards.

For example, distributed applications are typically rigid in their programming models allowing only one programming model that is tightly coupled to their service runtime. Accordingly, for compatibility, a client runtime (e.g., at a service consumer) is typically required to utilize a client program or module developed in accordance with the same programming model as the server runtime. For instance, if a service was developed using separate interfaces for request and reply messages or using particular security mechanisms, the service consumer must implement those as well. Failure to use a client program or module developed in accordance with the same programming model can prevent a client runtime from communicating with service runtime.

Further, current NPDLs bind a contract to a limited set of communication aspects which include a message exchange pattern (e.g., one-way, request-reply, pub-sub, duplex, etc.), a message encoding or format (e.g., SOAP envelope) and a type of transport for exchanging the message with a service (e.g., HTTP (HyperText Transport Protocol), FTP (File Transfer Protocol), SMTP (Simple Message Transfer Protocol), TCP (Transmission Control Protocol), UDP (User Datagram Protocol), SMS (Short Message Service), SNA (Systems Network Architecture), GPRS (General Packet Radio Service), etc.). Additional communication aspects (e.g., security, reliability, context flow, transaction flow, logging options, connection throttling options, etc.) must be specified in other documents (e.g., WS Policy) or configured out of band on both the client and service side.

Due to the wide spread distribution of communication aspects sprinkled throughout the system, there is some chance that through human error a service description document or configuration is not a complete, accurate description of the corresponding service. Due, however, to the rigid coupling between programming model and service runtime, the lack of even one communication aspect or configuration option defined by a service can result in an incompatible client runtime.

In addition, because not all communication aspects are provided for in NPDLs, both the client and the service must have a significant amount of code within each application in order to utilize and maintain communication aspects. For instance, in the case of a security context the client needs to have code that will: (1) recognize that communications with the service application must use a security context token; (2) request such token from a token issuer; (3) provide the appropriate information within the request; (4) save the security context token for future communications; and (5) reference the appropriate base token and shared secret when receiving communications from the service using the security context token. Likewise, the service application must be coded such that when receiving secured messages from the client based on the security context token, the service application must be able to: (1) identify the base token; (2) determine the appropriate session key associated with the base token to decrypt the message; (3) save the security context token; and (4) reuse the security context token to encrypt messages and sign them for securely delivering them to the client.

Because such communication aspects for security and other semantics must be coded in both the client and service applications, there is little, if any flexibility, nor ease in extending the system. For example, if it may be desirable to extend the service oriented system to enable it to use different types of security context tokens or have different reliability options; however, doing so would require another large amount of code in the service application and as well as rewriting existing code. Of course, security context may also be established at the transport level using, e.g., HTTPS. This solution, however, also does not allow any flexibility or ease in extending the system since the semantics are predefined by the specification. Further, because application developers are typically not experts in specific communication aspects, there are security concerns, reliability concerns, as well as performance, stress, or other robustness factors. Moreover, the large number of permutations and combinations of all of these communication aspects becomes unwieldy and difficult to fully appreciate the benefits of the various combinations.

Accordingly, there exists a need for a user interface that gives a developer an automated and user friendly way of binding messages to a wide array of communication aspects. This user interface should be capable of generating standardized tools that can be used by both client and service for consistency purposes. Moreover, a need exists for describing a list of commonly used and compatible communication aspects for limiting the number of possible permutations for binding protocols. In addition, the various communication aspects, as well as the commonly used combinations, should be fully flexible, extensible and pluggable.

BRIEF SUMMARY OF THE INVENTION

The above-identified deficiencies and drawbacks of current binding mechanisms are overcome through exemplary embodiments of the present invention. For example, the present invention provides a user interface that gives a developer an automated, user friendly way of constructing a binding object for use in creating a runtime communication channel in order to apply communication aspects on messages when transferring the messages between endpoints. Other exemplary embodiments provide presenting a developer with a list of commonly used and compatible binding objects for condensing the number of possible permutations for binding elements. In addition, the present invention also provides for a system that is able to use the created binding objects to generate a runtime communication channel for communicating messages between endpoints in accordance with communication aspects of a protocol.

In accordance with exemplary embodiments, the present invention provides for presenting a plurality of binding elements to a user for selection. The binding elements represent communication aspects that will ultimately be used to create a runtime communication channel for transporting a message between a client and a service endpoint. After presenting the plurality of binding elements, user input is received selecting one or more binding elements from the plurality of binding elements. Based on the selection, metadata, a channel factory and a listener factory are created. The metadata describing a binding object, which is a collection of the one or more binding elements and provides an abstract representation of a protocol that will implement the communication aspects at runtime. The channel factory is configured to use the metadata at runtime to generate the runtime communication channel. Whereas the listener factory is configured to accept the runtime communication channel and de-multiplex the communication aspects in order to process the message at the service endpoint.

Other exemplary embodiments provide for presenting a plurality of binding objects to a user for selection. The plurality of binding objects, each including a plurality of binding elements that are combined based on compatibility and industry probability of combining the plurality of binding elements. Further, each of the plurality of binding elements represents a plurality of communication aspects that will ultimately be used to create a runtime communication channel for transporting a message between a client and a service endpoint. Thereafter, user input is received selecting a binding object from the plurality of binding objects. Thereafter, metadata is automatically created describing the selected binding object, which provides an abstract representation of the runtime communication channel that will implement the communication aspects at runtime.

Still other exemplary embodiments provide for accessing metadata that describes a binding object that includes one or more user selected binding elements, which represent one or more communication aspects that will ultimately be used to create a runtime communication channel for transporting a message between a client and service endpoint. Based on the metadata, a runtime communication channel is initiated that includes one or more channel components configured to implement the one or more communication aspects corresponding to the one or more user selected binding elements. Thereafter, the runtime communication channel is used to transfer the message in accordance with the one or more communication aspects to an endpoint associated with the service.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates a flowchart of a method of providing a developer with an automated, user friendly way of constructing a binding object in accordance with exemplary embodiments of the present invention;

FIG. 5 illustrates a flowchart of a method of providing a developer with a list of commonly used and compatible binding objects in accordance with exemplary embodiments of the present invention;

FIG. 6 illustrates a flowchart for a method of using a binding object to create a runtime communication channel in accordance with exemplary embodiments; and FIG. 7 illustrates an example system that provides a suitable operating environment for the present invention.

DETAILED DESCRIPTION OF THE PREFERRED EMBODIMENTS

The present invention extends to methods, systems and computer program products for assisting a developer in creating a binding object that can be used to generate a runtime communication channel in accordance with example embodiments. The embodiments of the present invention may comprise a special purpose or general-purpose computer including various computer hardware, as discussed in greater detail below.

Prior to discussing exemplary embodiments of the present invention in great detail, it will useful to define some terms used throughout the rest of the application. "Communication aspects" correspond to a concrete set of formal rules for carrying messages between endpoints in a distributed system. Examples of communication aspects include, but are not limited to: (1) the actual specification of Web Services (WS) family (e.g., WS-Security, WS-Reliable Messaging, WS-Atomic Transactions, etc.); (2) a particular wire transmission mechanism (e.g., HTTP, TCP, UDP, etc.); (3) a particular wire encoding of a message (e.g., text, binary, etc.); and (4) other miscellaneous transfer protocols. These communication aspects are intended to be composed with one another to create a "protocol stack" that can be implemented through the use of a runtime communication channel described below. Each protocol stack will typically include at least a transport aspect and an encoding aspect (e.g., a SOAP message over TCP). Note, however, that each communication aspect is itself a protocol. Accordingly, "protocol stack" as used herein should be broadly construed to include one or more communication aspects.

An abstract representation of a communication aspect is known as a "binding element", which can be used to create the runtime communication channel to implement the communication aspects (and thus the protocol stack). A collection of binding elements will be referred to herein as a "binding object" which represents an abstract representation of a particular protocol stack or combination of communication aspects.

Figure 1:
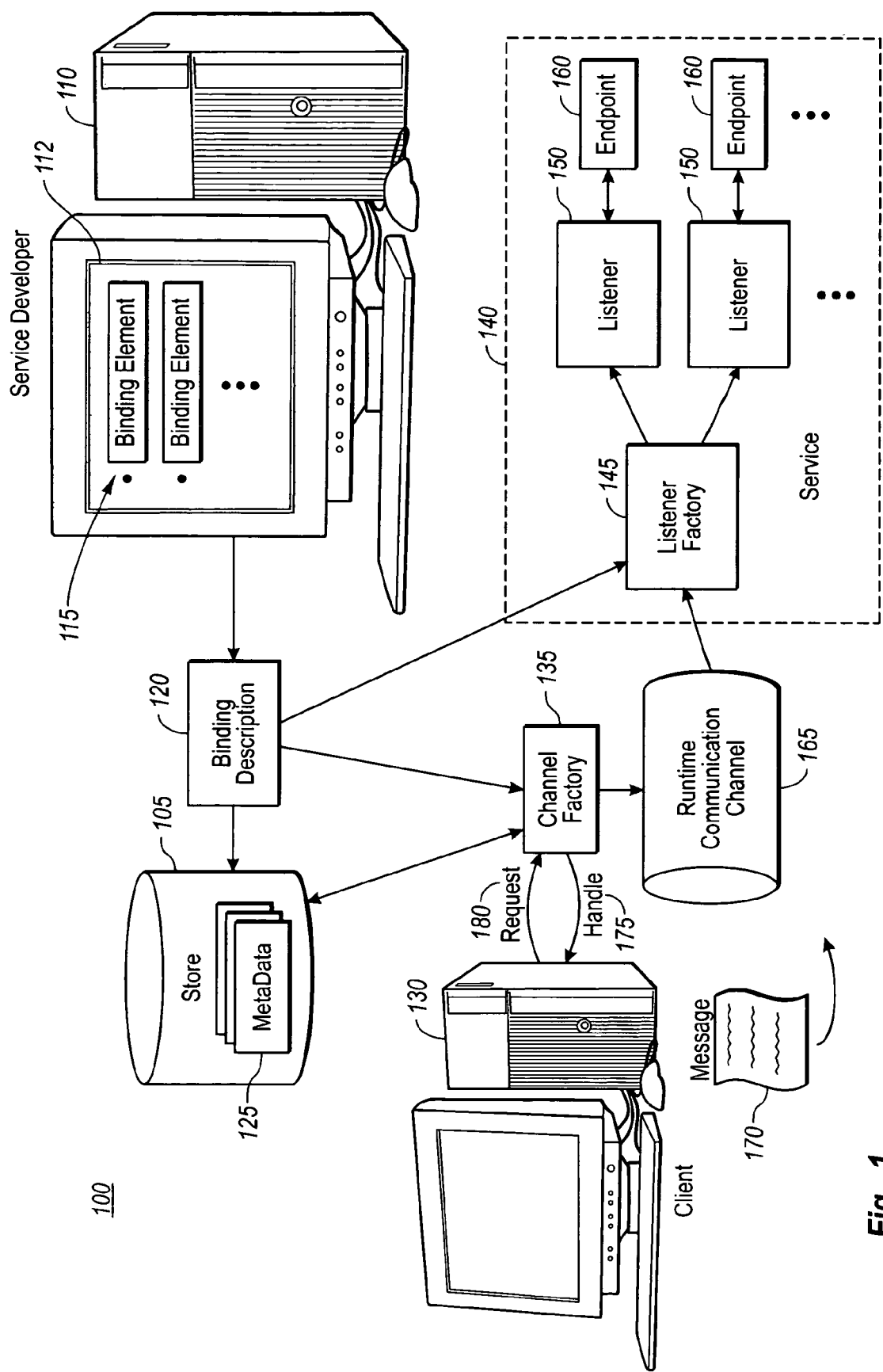
FIG. 1 illustrates a distributed system that utilizes metadata to construct a runtime communication channel for transferring a message to a service in accordance with exemplary embodiments.

The present invention generally provides for systems, methods and computer program products for creating and using binding objects to transfer messages between endpoints. FIG. 1A illustrates a distributed system 100 with various components that can be used to create and use binding objects for transferring a message from a client to a service in accordance with exemplary embodiments. As shown, a service developer may be presented with a user interface 112 at the developer application 110 for selecting binding elements 115. These binding elements 115 are presented in an easily understandable way, and can provide various descriptions to assist a user in their selection. For example, the user interface may prompt the user for information, such as, "do you want security?", "do you want reliability?", etc. Based on the user input, other options or questions may follow. Further, as will be described in greater detail below, these binding elements can be combined into groups or composed into standard binding objects during the presentation process. The developer can then select from among the various options provided using the user interface 112.

Note that the present invention also supports defining default binding elements and/or binding objects. Accordingly, if a developer doesn't choose binding elements, but just proceeds, a default binding object that includes one or more of the binding elements 115 may be automatically selected for the user. As such, the use of the term "user selected" or other similar wording as used herein should be broadly construed to include the default binding element or object. In such instance, the user input received for selecting the default binding element 115 may be input to proceed without selecting binding elements (or other binding objects as described below).

Once the developer has finished making her/his selection, a binding object is created from the combined chosen binding elements. Using the binding object, a binding description 120 is constructed, which is used by a binding builder (not shown) to create several different exemplary embodiments. First, the binding description 120 can be used to create a collection of metadata 125, which is a description of the binding object that can be stored on store 105. Although, this metadata can reside at the service 140, it may also reside in a NPDL document (e.g., a WSDL document) stored in a directory of services, e.g., that uses Universal Description, Discovery, and Integration ("UDDI").

Second, the binding description 120 can also be used to create a channel factory 135, which uses metadata 125 to create a runtime communication channel 165. Channels (e.g., runtime communication channel 165) represent the core abstraction for exchanging messages between client 130 and service 140. In particular, channels (e.g., runtime communication channel 120) represent input/output (I/O) abstraction and are responsible for: (1) accepting application data or messages 170 (e.g., SOAP messages); (2) implementing the various communication aspects (e.g., reliability, security, encoding, etc.); (3) formatting the message 170 for transmission in accordance with the communication aspects; and (4) transmitting the message 170 over the "wire". Note also, that the runtime communication channel 165 can support and maintain throttling and flow control using a pull-based mechanism in the communication aspects.

In addition, the binding description 120 is used to create a listener factory 145 for service 140. At the service side 140, a listener factory 170 listens on a particular network address for new messages, e.g., message 170, and provides a mechanism for creating a listener 150 that communicates with a particular endpoint 160 of the service 140. Listener factory 145 may then de-multiplex a portion of the message 170 and send the message 170 to the appropriate listener 150.

Note that being able to obtain metadata 125 (e.g., a WSDL document) from a service 140, and then generating a runtime communication channel 165 is an important part of the "user friendliness" provided for in the present invention. For example, a developer can pick binding elements 115 for a service 140, and then another developer can remotely query the service 140 for its metadata 125. From this metadata 125 an application can generate the runtime communication channel 165 and use it to transfer messages to the service 140 in accordance with the service developer's choices of binding elements 115.

Further note that although the above objects 125, 135, 145 created using the binding description 120 where discussed in a particular order, the present invention is not limited to an ordering or timing for generating these objects. For example, the metadata 125, the channel factory 135, and the listener factory 145 may be simultaneously created, created separately in any order, or combinations thereof.

Regardless of when the communication objects 125, 135, 145 are created, in order to access the service 140, the client 130 actively requests 180 a channel from channel factory 135 for that particular service 140. Channel factory 135 then accesses the metadata 125 from store 105 and may use this description of the binding object to initiate runtime communication channel 165. Although the specific details of the runtime communication channel 165 are not germane to this example embodiment, it is worth noting that the runtime communication channel 165 is typically composed of communication components corresponding to the various communication aspects (that when combined and implemented make up the protocol stack). For example, the runtime communication channel 165 may include a security component, a reliability component, a transport component and an encoding component. These components then combine to create an overall runtime communication channel 165 for implementing the protocol.

Upon receiving request 180, channel factory 135 returns a handle 175 (which may be the runtime communication channel 165 or an identifier thereof) to the client 130 such that the client 130 can appropriately reference and use the runtime communication channel 165 to pass message 170 to the service 160 in accordance with specified communication aspects. Note that although the present invention derived these communication aspects from chosen binding elements from a developer, the current embodiment is not limited to such selection process. For example, the metadata 125 may be representative of a default binding object or a binding object specified through configuration semantics by a system administrator on the service side. Accordingly, for this embodiment it is the use of the metadata 125 for creating the runtime communication channel 165 that is important. Note, however, that the runtime communication channel 165 should typically include at least a transport aspect and an encoding aspect, as previously mentioned.

Regardless of how the runtime communication channel 165 is initiated, on the service side 140 a listener factory 145 will listen for the runtime communication channel 165 and create an appropriate listener 150. A listener 150 represents an abstraction for listening for and accepting new runtime communication channels 165 on the service side 140. When a new channel (e.g., runtime communication channel 165) is detected by a listener 150, an endpoint 160 may call an "accept channel," which allows the listener to de-multiplex the message 170 in accordance with the communication aspects implemented by the runtime communication channel 165. Alternatively, the endpoint 160 may "pend" an outstanding begin accept, which can later be completed once other messages have been processed. In either event, thereafter, the endpoint 160 can process the message accordingly and send the appropriate response, if needed.

Note that depending upon the message exchange pattern between the client 130 and the service 140, a runtime communication channel 165 may be generated from the service 140 to the client 130. For example, in a duplex message exchange pattern between the client 130 and service 140, a reverse channel from the service 140 to the client 130 may need to be generated for such communication. Accordingly, the above described communication process may need to be switched such that the service 140 acts as a client 130 and vise versa. Further, there may be other ways of implementing the aforementioned exemplary embodiments. For example, the metadata 125, channel factory 135, and listener factory 145 may be automatically generated without the binding description. Accordingly, the specific implementations for generating runtime communication channel 165 and using such communication channel to transfer messages is used for illustrative purposes only and it is not meant to limit or otherwise narrow the scope of the present invention unless explicitly claimed.

Figures 2A, 2B:
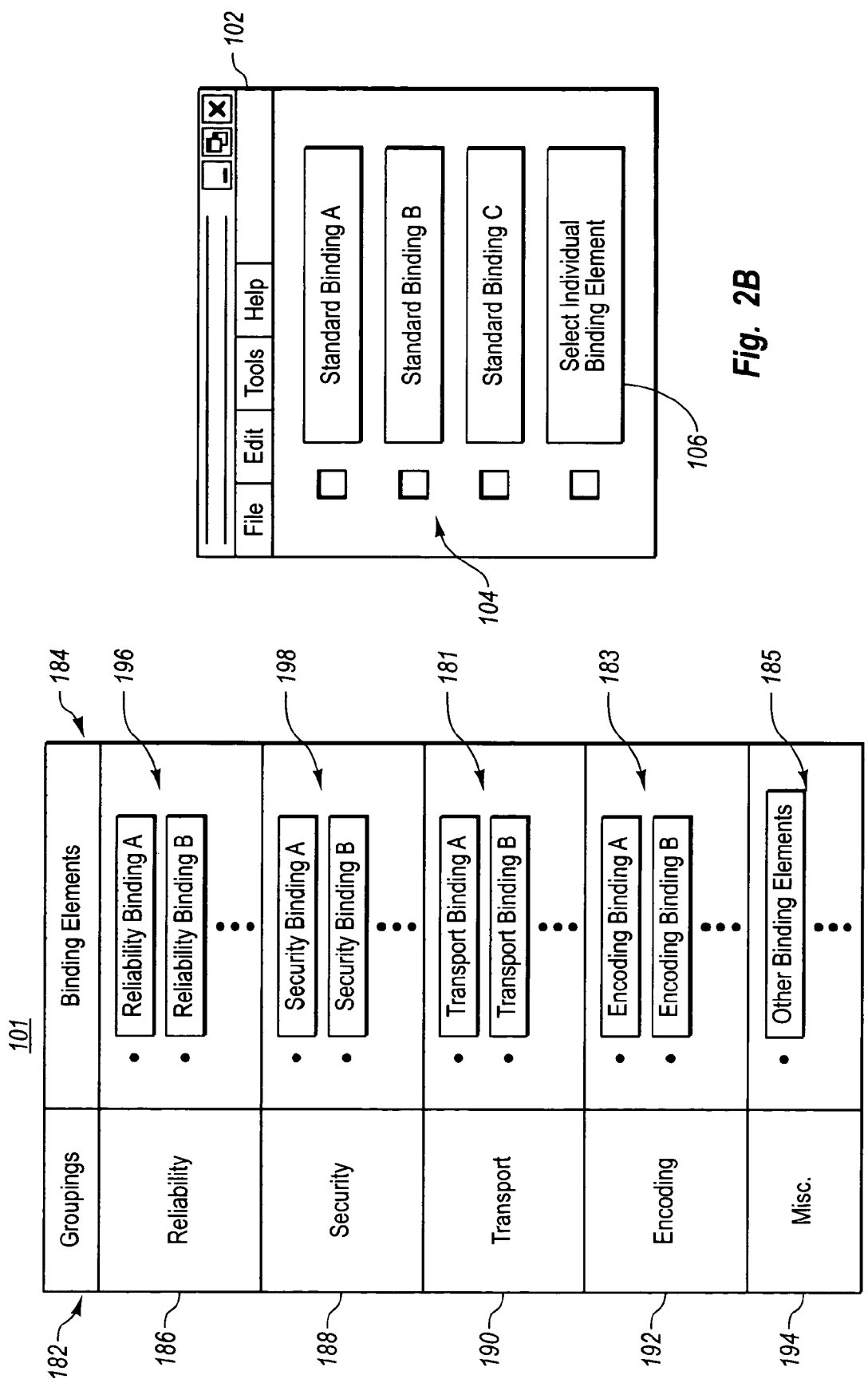
FIG. 2A illustrates an example of binding elements grouped in accordance with exemplary embodiments.
FIG. 2B illustrates an example user interface for selecting standard bindings.

FIG. 2A illustrates a general user interface 101 were various binding elements have been grouped according to their common characteristics. For example, one grouping 182 includes the reliability 186 grouping that may have several binding elements 184 (shown as reliability binding A and reliability binding B 196). Such reliability binding elements 196 may be from the WS family, bound to a specific transport (e.g., HTTP) or they could be proprietary reliability binding elements 196. This organization of binding elements 184 into groups 182 eases the definition of binding elements 184 and represents the most commonly requested features of that particular group 182.

As shown, other groupings may include a security group 188 with various security bindings elements 198 (e.g., WS-Security, HTTPS, proprietary, etc.), the transport group 190 with transport binding elements 181 (e.g., HTTP, HTTPS, HTTPR, named pipes, TCP, UDP, queued messaging; queued integration messaging, etc.), a encoding group 192 with encoding binding elements 183 (e.g., text, binary, SOAP, Message Transmission Optimization Mechanism (MTOM), etc.) and a miscellaneous group 194. Of course, there may be other groupings 182 (e.g., "WS Family" grouping) representing other common communication aspects. In fact, as mentioned in greater detail below, groupings are fully pluggable and extensible allowing for proprietary and other groupings. As such, the above identified list of groupings and binding elements within each group is used for illustrative purposes only and is not meant to limit or otherwise narrow the scope of the present invention unless explicitly claimed.

This last miscellaneous grouping 194 may include other binding elements 185 that do not fit neatly into any particular group 182. For example, the other binding elements 185 may be one or more of the following: (1) a composite duplex binding element, where different communication channels can be combined into one duplex channel; (2) message format binding element for determining if a message is an RPC/literal, RPC/encoding, document/literal, document/encoded; (3) a context flow binding element for the execution of context; and (4) a transaction flow binding element for flow of transactions. Of course there may be many other binding elements 185 that do not fit into other common groupings 182. Accordingly, the above list of other binding elements 185 is used for illustrative purposes only and is not meant to limit or otherwise narrow the scope of the present invention.

In fact, as previously mentioned, example embodiments provide that the groupings 182 and binding elements 184 are fully pluggable and extensible. That is, groupings 182, and even the binding elements 184 in each group 182, can be removed, inserted or expanded as needed without having to rewrite the application for creating the binding objects. Note that because each of the groupings 182 and binding elements 184 within each grouping are pluggable and extensible, the above-identified list of groups 182 and binding elements 184 is not meant to be all inclusive. Accordingly, the above-identified lists and other lists hereinafter, are used for used for illustrative purposes only and are not meant to limit or otherwise narrow the scope of the present invention unless explicitly claimed.

Also note that the user interface shown in FIG. 2A is a simple display of binding elements 184 that can be chosen using a radio button. Other user interfaces, however, are also available to the present invention. For example, the binding elements and/or groupings 182 may be displayed individually or collectively. Moreover, the type of selection may differ from a simple radio button to, e.g., a check box, a highlighting, etc. Further, the binding elements (or objects as the case may be) can be provided for in a wizard, wherein the next options available may depend from previous choices made. In addition, when an application developer is writing a class, a popup box may appear that lets the user scroll through an auto-complete of options. In fact, there exists numerous user interface designs bearing different aesthetic aspects for accomplishing the aforementioned function. As such, any specific user interface as described or shown herein is used for illustrative purpose only and is not meant to limit or otherwise narrow the scope of the present invention unless explicitly claimed.

Although the above groupings 182 of binding elements 194 provide a flexible mechanism for defining custom communication binding objects from a set of common communication features, such flexibility creates an unwieldy problem of having numerous binding objects (i.e., the number of binding elements and possible combinations thereof). In fact, as one begins to do the math, the number of possible binding objects ranges into the tens of thousands. As such, developers unfamiliar with the particular binding elements may not know what combination is best suited for their particular needs.

Accordingly, other exemplary embodiments provide for standardized bindings, which are a collection or composition of industries' most common types of communication binding objects. In other words, exemplary embodiments provide for pre-built binding objects by combining various binding elements that have proven to be the most common types. FIG. 2B illustrates an example user interface 102 for presenting a developer with various standard bindings 104 that the user can select from. The user may also be presented with an option of selecting the individual binding elements as shown at 106.

The following is a list of some of the most common types of communication binding objects as currently used in industry standards. Although this list outlines specific binding elements to create such binding objects, as industry grows and changes these binding elements may also change. Accordingly, the following list is not meant to be inclusive, but simply an example combination of binding elements that are currently thought to have a high probability of being commonly combined.

One type of current pre-built binding object may be a basic profile binding object, suitable for communication with web services that are conformant with Web Services Interoperability: Basic Profile (WSI-BP). This binding object uses text encoding over HTTP or HTTPS and supports one way and request-reply MEPs (Message Exchange Patterns). This binding object, however, does not support duplex MEP, transport sessions, and reliable sessions.

Another common binding may be a WS profile binding, which is suitable for secure, reliable communication with web services that use the WS suite or family over the HTTP or HTTPS transport. This biding object can encode in text or MTOM and supports HTTP or HTTPS transports protocols. In addition, this transport offers reliable session and one-way, request-reply and duplex MEPs. Another similar binding is the WS profile dual HTTP binding, which is suitable for secure, reliable communication with web services that use two-way HTTP communication in conjunction with the WS family.

NET profile TCP binding objects may be available, which are suitable for secure, reliable communication between services that implement the .NET family of protocols via binary over the TCP transport with or without TLS/SSL used for security. Another similar pre-built binding object may be the .NET profile named pipes binding object, which is suitable for secure, reliable communication between processes on the same machine. In addition, the .NET profile dual TCP binding may also be available, which is suitable for secure, reliable communication between services that implement the .NET family of protocols over two one-way TCP connections. Moreover, .NET queued messaging and secured queued messaging bindings are also available, which are suitable for secure, queued communication between services that are capable of using various queued transport securities. Also available is a queued integration binding, which is suitable for binding an application that interoperates with an existing queued application.

Other common types of communication binding objects may include intermediary bindings, e.g., intermediary HTTP, TCP and named pipe bindings. Each of these is suitable for binding a SOAP intermediary that listens on HTTP, TCP, or named pipes, respectively.

As previously stated, given the exemplary embodiments of defining binding elements, the number of possible binding objects range into the thousands. Accordingly, after significant scenario analysis and winnowing, the above list of standard binding define a concise and unique set of binding objects that cover the vast majority of common used cases. Also as previously stated, however, this list is extensible and pluggable as industry standards change and as needed. Additionally, rather than defining the configuration knobs for each binding object by taking the strict union of all of the configuration knobs on the children binding elements, exemplary embodiments "re-expose" those configuration knobs that are most likely to be needed.

Figure 3A:
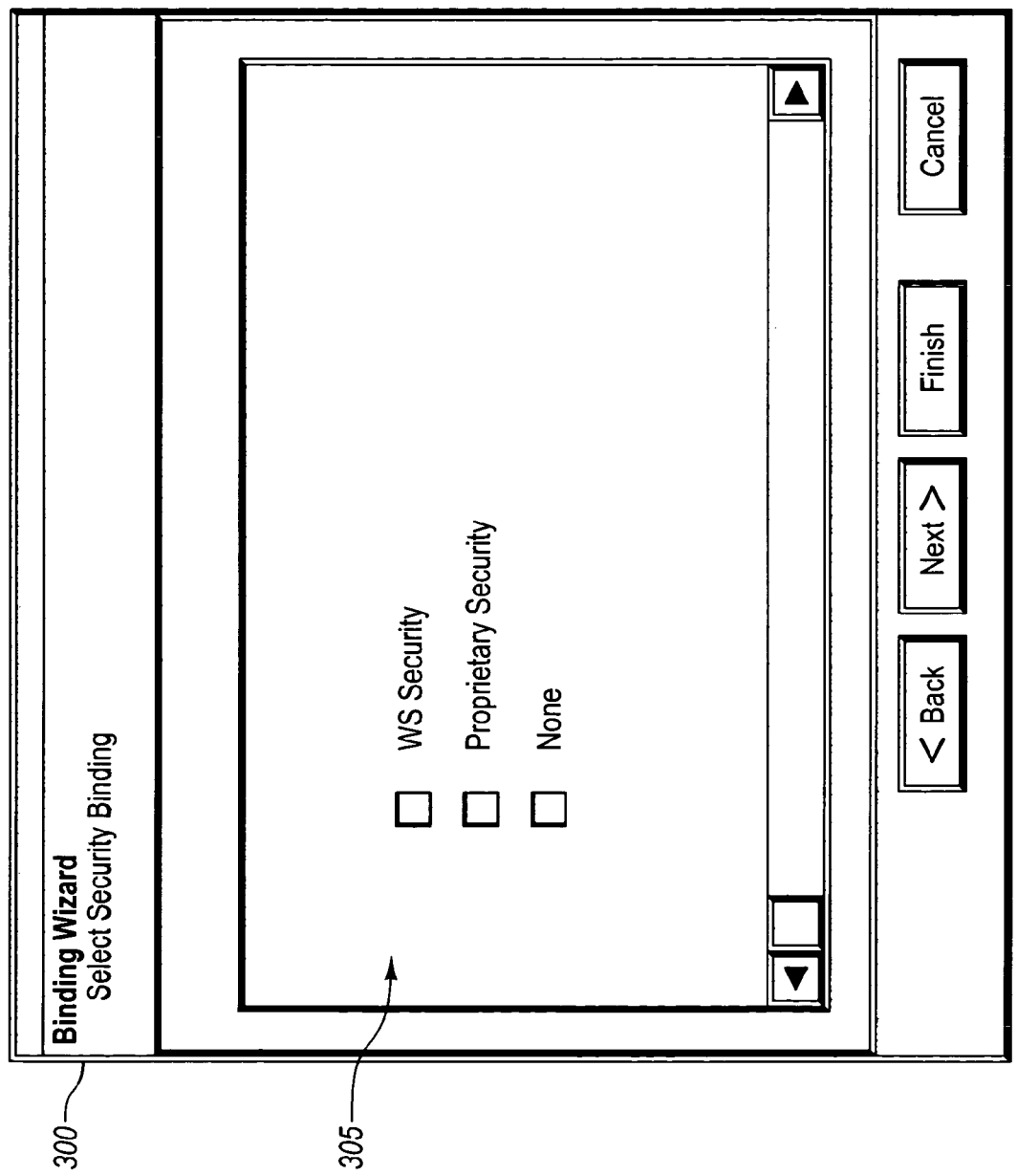
FIG. 3A-E illustrate various wizard type user interfaces that can be used in accordance with exemplary embodiments of the present invention.
Figure 3B:
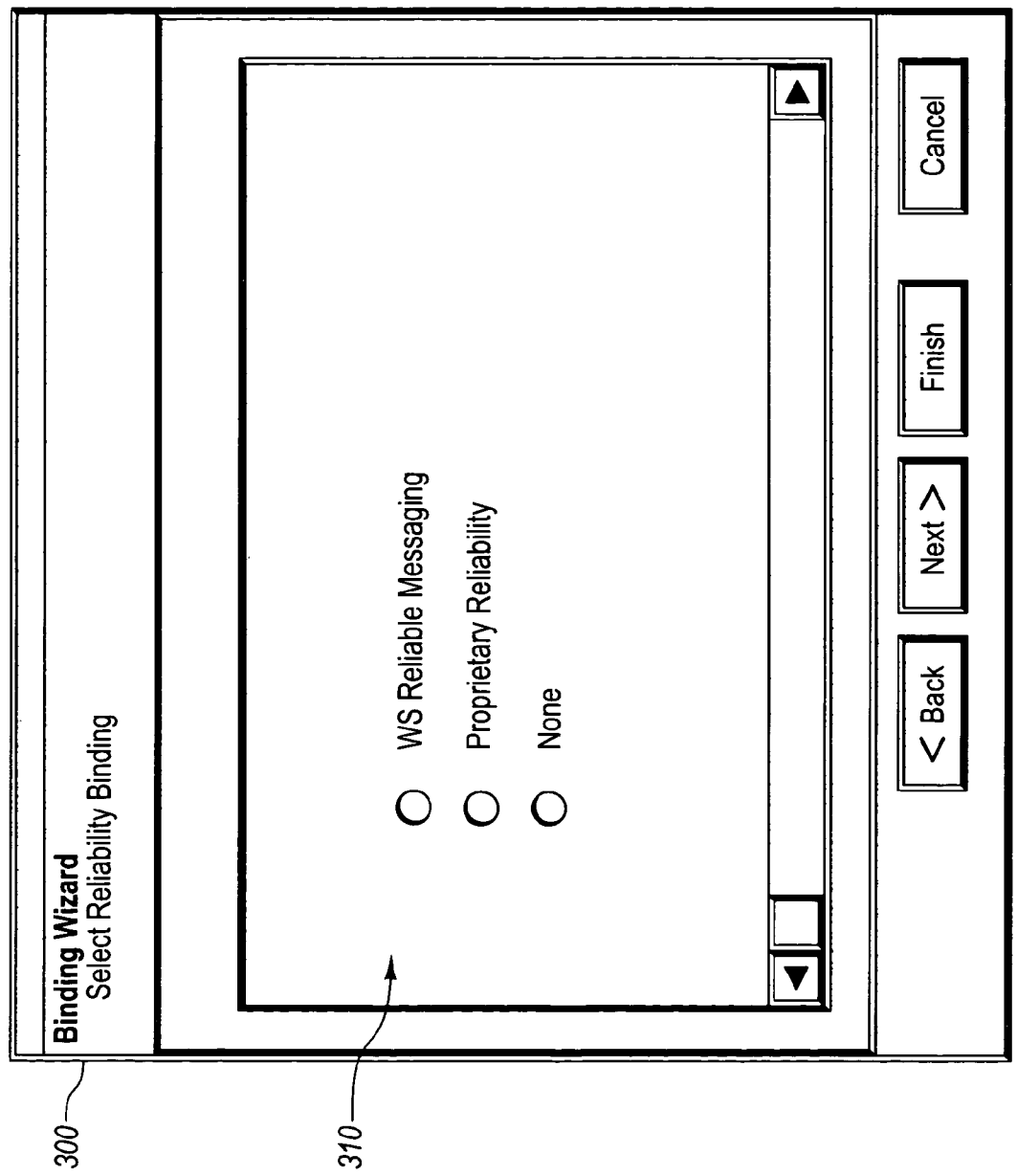
Figure 3C:
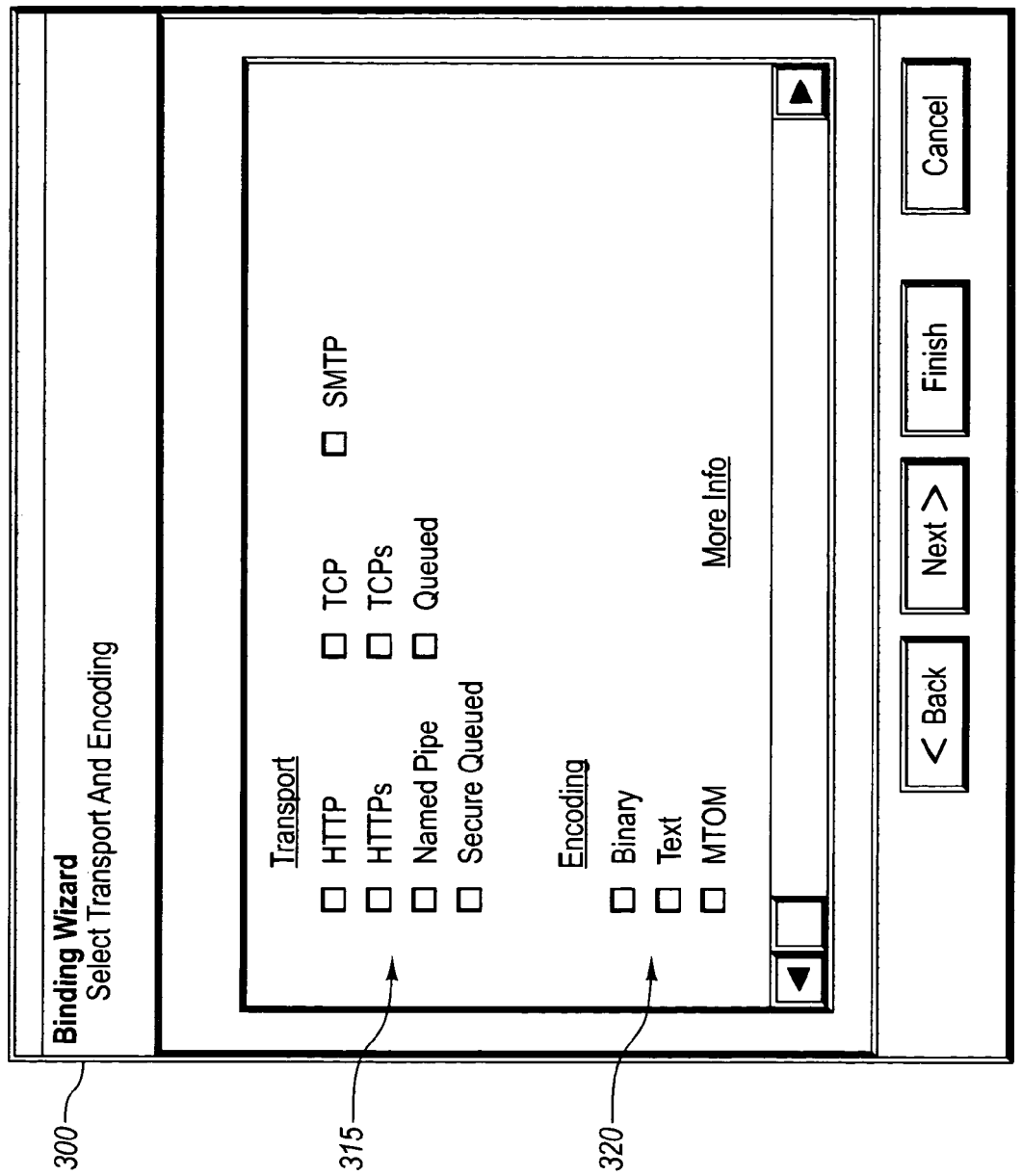
Figure 3D:
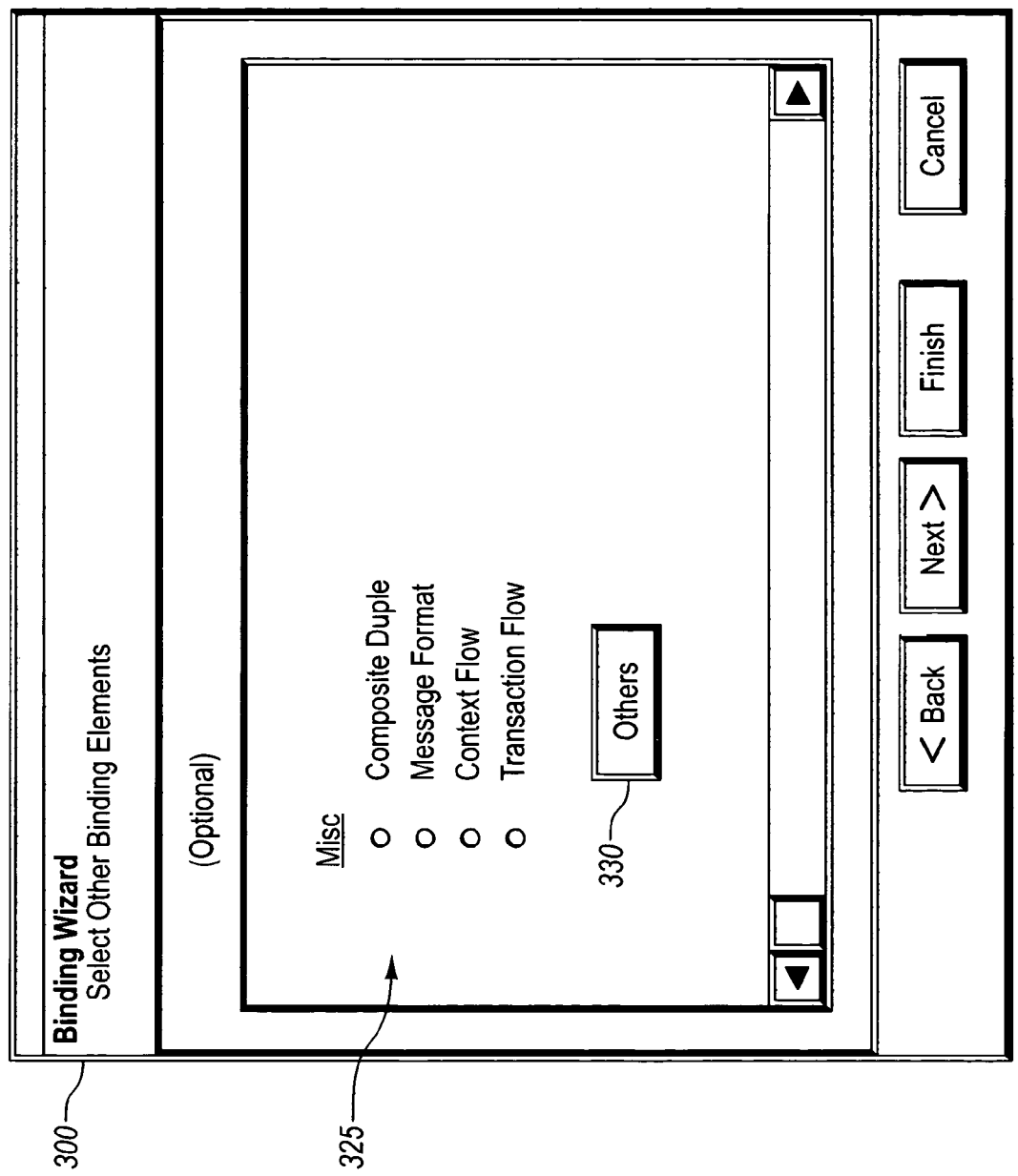
Figure 3E:
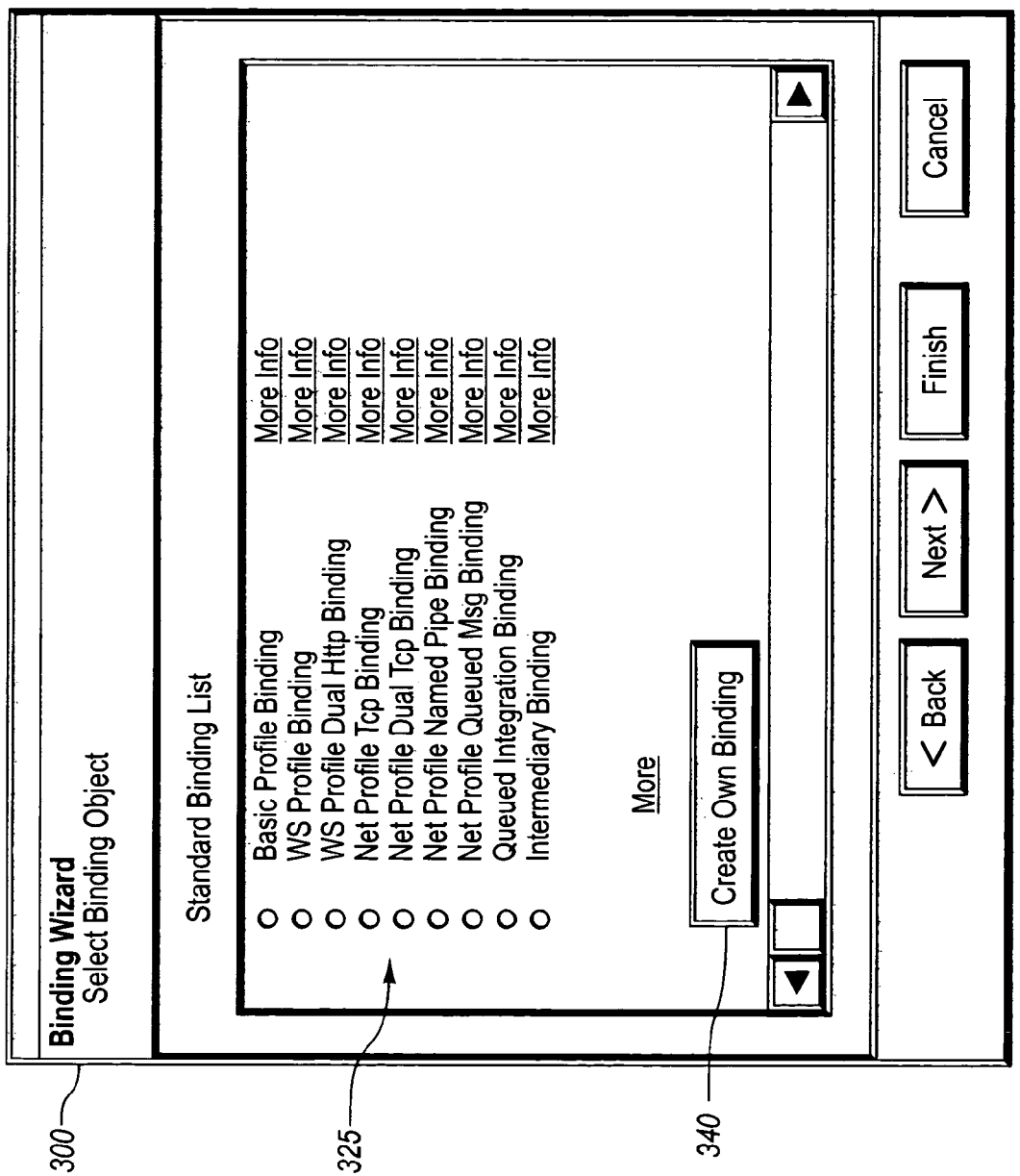

FIGS. 3A-E illustrate how the various groupings and standard bindings as previously described may be presented in a Wizard type user interface (UI). For example, FIG. 3A illustrates a binding Wizard user interface 300 that allows for the selection of security bindings 305, if any. Similarly, FIG. 3B illustrates a binding Wizard UI 300 that allows for the selection of various security binding elements 310. In FIG. 3C, the binding Wizard UI 300 allows the user to select from a plurality of transports 315 and encodings 320. As previously discussed, FIG. 3D provides a binding Wizard 300 with a Misc. grouping 325 that that includes optional binding elements that can be chosen along with other bindings 330. Finally, FIG. 3E presents a binding Wizard UI 300 with a list of standard bindings 325 as previously described. Of course, this UI 300 may include an option for creating a proprietary binding 340.

Note that in certain circumstances, one or more of the binding elements may be required or restricted from selection. For example, a requirement of choosing both a transport and an encoding binding may be required. A selected transport, however, may not support a particular type of encoding; and therefore the developer may be limited to only selection those encodings that are supported. In addition, there may be defaults for a particular transport or other binding element, wherein the developer is not given an option of choosing an encoding or other binding element based on previous choices made. Accordingly, the present invention is configured to implement various rules on the selections available to the service developer. Note, however, that there are numerous requirements or restrictions that can be defined and implemented. Accordingly, the above example for requirements and restriction is used for illustrative purposes and the present invention is capable of configuring many (or no) rules for implementation purposes.

The present invention may also be described in terms of methods comprising functional steps and/or non-functional acts. The following is a description of steps and/or acts that may be preformed in practicing the present invention. Usually, functional steps describe the invention of results that are accomplished whereas non-functional acts describe more specific actions for achieving a particular result. Although the functional steps and/or non-functional acts may be described or claimed in a particular order, the present invention is not necessarily limited to any particular order or combination of steps and/or acts. Further, the use of steps and/or acts in the recitation of the claims—and the following description of the flowcharts for FIGS. 4-6—are used to indicate the desired specific use of such terms.

FIGS. 4-6 illustrate flowcharts for various exemplary embodiments of the present invention. The following description of FIGS. 4-6 will occasionally refer to corresponding elements from FIGS. 1A-C and 3A-E although reference may be made to a specific element from these Figures, such elements are used for used for illustrative purposes only and it is not meant to limit or otherwise narrow the scope of the present invention unless explicitly claimed.

FIG. 4 illustrates an example flow chart of a method 400 of providing a developer with an automated, user friendly way of constructing a binding object for use in creating a runtime communication channel used to transfer message between endpoints. Method 400 includes an act of presenting 405 a plurality of binding elements to a user for selection. For example, service developer application 110 can use UI 112 to present a plurality of binding elements 115 to a user for selection. The binding elements 115 representing communication aspects of a runtime communication channel 165 for transporting message 170 between client 130 and a service 140 or service endpoint 160.

These communication aspects should include at least a transport aspect (e.g., UDP, HTTP, HTTPS, HTTPR, TCP, SMTP, messaging middleware, messaging middleware integration, etc.) and an encoding aspect (e.g., text, binary, SOAP, MTOM, etc.). Further, the communication aspects may include reliability, security, composite duplex, message format, context flow, transaction flow, etc. In addition, the binding elements are fully extensible and customizable in that binding elements can be added, modified or removed without having to rewrite the application that presents the plurality of binding elements to the user or the underlying builder that constructs the metadata, channel factory and listener factory, as described above. Moreover, these binding elements may be presented to the user in groups, e.g., reliability group, security group, transport group, encoding group, miscellaneous group, etc. Similar to the individual binding elements, the groups are fully extensible and pluggable, in that binding elements can be added, removed or modified to each group and the groups themselves can be added, removed or modified without breaking the system.

Method 400 also includes an act of receiving 410 user input selecting one or more binding elements from the plurality of binding elements. Accordingly, service developer application 110 may receive user input that selects binding elements 115 corresponding to the transport aspect and/or the encoding aspect. Based on the selection, method 400 also includes an act of creating 415 metadata, a channel factory and a listener factory. More specifically, the service application 110 (or binding builder as previously described) upon receiving the selection of binding elements 115 may produce a collection of metadata 125 that describes the binding object that includes the binding elements. The collection of metadata 125 will provide an abstract representation of a protocol that will implement the communication aspects at runtime. This metadata 125 may be part of a WSDL document or in some other form. In addition, the service developer application can a create channel factory 135, which can be configured to use the collection of metadata 125 at runtime to generate a runtime communication channel 165. Further, service developer application 110 can be used to generate or create a listener factory 145 that is configured to accept the runtime communication channel in order to process the message at the service endpoint. When composite duplex binding element is selected, two transport binding elements and/or two encoding binding elements may be selected. Of course, one transport and/or one encoding binding element may be selected and assumed for both directions.

FIG. 5 illustrates a method 500 of providing a developer with a concise way of automatically constructing a binding object by presenting the developer with a list of commonly used and compatible binding objects, which can be used to create a runtime communication channel. Method 500 includes an act of presenting 505 a plurality of binding objects to a user. That is, as shown in FIG. 1C, a user may be presented with UI 102 that includes a plurality of binding objects 104 for selection. The plurality of binding objects 104 each including a plurality of binding elements 115 that are combined based on compatibility and industry probability of combining the plurality of binding elements. Further, each of the plurality of binding elements 115 represent a plurality of communication aspects that will ultimately be used to create a runtime communication channel 165 for transporting a message 170 between a client 130 and service endpoint 160. Communication aspects may include the aforementioned communication aspects of encoding type, transport type, reliability, security, composite duplex, etc.

Method 500 also includes an act of receiving 510 user input selecting a binding object from the plurality of binding objects. That is, UI 102 may receive user input selecting a binding object from a plurality of binding objects 104. Method 500 also includes an act of automatically creating 515 metadata describing the selected binding objects. That is, metadata 125 may be generated based upon the selection of a standard binding 104 from the plurality of standard bindings 104. The binding object described within the metadata provides an abstract representation of a protocol stack that will implement the communication aspects at runtime.

In addition, channel factory 135 may be created that is configured to use the metadata 125 at runtime to generate a runtime communication channel 165. Further, a listener factory may be configured to accept the runtime communication channel 165 and de-multiplex the communication aspects for processing the message at the service endpoint 160. The binding objects may be one or more of a basic profile binding, WS profile binding, WS profile dual binding, Net profile TCP binding, Net profile dual TCP binding, Net profile named pipe binding, Net profile queued binding, queued integration binding, intermediary binding, etc.

FIG. 6 illustrates a method 600 of using a binding object to create a runtime communication channel for implementing a protocol used to communicate messages between endpoints. Method 600 includes an act of accessing 605 metadata that describes a binding object. More specifically, channel factory 135 may access the metadata 125 that includes a binding object with a plurality of user selected binding elements that represent how messages are to be transported between endpoints in a distributed system 100. Based on the binding object, method 600 also includes an act of initiating 610 a runtime communication channel. More specifically, based on the binding object within the metadata 125, channel factory 135 can initiate a runtime communication channel 165 that includes communication aspects corresponding to the user selected binding elements. The communication aspects are combined into a protocol that includes at least a transport aspect and an encoding aspect as previously described. Further, method 600 includes an act of using 615 the runtime communication channel to transfer a message in accordance with the communication aspects. More specifically, client 130 after requesting a channel 180 from channel factory 135 may receive a handle 175 which is used to reference the runtime communication channel 165. Thereafter, message 170 may be sent or transferred in accordance with the communication aspects or protocol stack to an endpoint 160 associated with the service 140.

Other exemplary embodiments provide that prior to sending the message 170 to the service endpoint 160, a listener 150 corresponding to the service endpoint 160 accepts the runtime communication channel 165 and creates a service communication channel for de-multiplexing the communication aspects from the message in order to consume the message at the service endpoint 160. Other aspects previously described are also available to this particular method 600.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 7 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 7, an exemplary system for implementing the invention includes a general purpose computing device in the form of a conventional computer 720, including a processing unit 721, a system memory 722, and a system bus 723 that couples various system components including the system memory 722 to the processing unit 721. The system bus 723 may be any of several types of bus structures including a memory bus or memory controller, a peripheral bus, and a local bus using any of a variety of bus architectures. The system memory includes read only memory (ROM) 724 and random access memory (RAM) 725. A basic input/output system (BIOS) 726, containing the basic routines that help transfer information between elements within the computer 720, such as during start-up, may be stored in ROM 724.

The computer 720 may also include a magnetic hard disk drive 727 for reading from and writing to a magnetic hard disk 739, a magnetic disk drive 728 for reading from or writing to a removable magnetic disk 729, and an optical disk drive 730 for reading from or writing to removable optical disk 731 such as a CD-ROM or other optical media. The magnetic hard disk drive 727, magnetic disk drive 728, and optical disk drive 730 are connected to the system bus 723 by a hard disk drive interface 732, a magnetic disk drive-interface 733, and an optical drive interface 734, respectively. The drives and their associated computer-readable media provide nonvolatile storage of computer-executable instructions, data structures, program modules and other data for the computer 720. Although the exemplary environment described herein employs a magnetic hard disk 739, a removable magnetic disk 729 and a removable optical disk 731, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 739, magnetic disk 729, optical disk 731, ROM 724 or RAM 725, including an operating system 35, one or more application programs 36, other program modules 737, and program data 738. A user may enter commands and information into the computer 720 through keyboard 740, pointing device 742, or other input devices (not shown), such as a microphone, joy stick, game pad, satellite dish, scanner, or the like. These and other input devices are often connected to the processing unit 721 through a serial port interface 746 coupled to system bus 723. Alternatively, the input devices may be connected by other interfaces, such as a parallel port, a game port or a universal serial bus (USB). A monitor 747 or another display device is also connected to system bus 723 via an interface, such as video adapter 748. In addition to the monitor, personal computers typically include other peripheral output devices (not shown), such as speakers and printers.

The computer 720 may operate in a networked environment using logical connections to one or more remote computers, such as remote computers 749a and 749b. Remote computers 749a and 749b may each be another personal computer, a server, a router, a network PC, a peer device or other common network node, and typically include many or all of the elements described above relative to the computer 720, although only memory storage devices 750a and 750b and their associated application programs 736a and 736b have been illustrated in FIG. 7. The logical connections depicted in FIG. 7 include a local area network (LAN) 751 and a wide area network (WAN) 752 that are presented here by way of example and not limitation. Such networking environments are commonplace in office-wide or enterprise-wide computer networks, intranets and the Internet.

When used in a LAN networking environment, the computer 720 is connected to the local network 751 through a network interface or adapter 753. When used in a WAN networking environment, the computer 720 may include a modem 754, a wireless link, or other means for establishing communications over the wide area network 752, such as the Internet. The modem 754, which may be internal or external, is connected to the system bus 723 via the serial port interface 746. In a networked environment, program modules depicted relative to the computer 720, or portions thereof, may be stored in the remote memory storage device. It will be appreciated that the network connections shown are exemplary and other means of establishing communications over wide area network 752 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method within a computing system of providing a developer with an automated way of constructing a binding object for creating a runtime communication channel in order to apply communication aspects on messages when transferring the messages between endpoints, the method comprising:
presenting to a user on a display device of the computing system a user interface;
presenting to the user within the user interface a plurality of binding elements for selection, the binding elements representing communication aspects that will be used to create a runtime communication channel for transporting a message between a client and service endpoint, each communication aspect corresponding to a formal rule for carrying messages between endpoints in a distributed system, the binding elements including one or more default binding elements which comprise one or more default communication aspects which may be overridden by user selection of one or more of the plurality of binding elements;
presenting to the user a description of each of the plurality of binding elements;
prompting the user for information associated with security and information associated with reliability;
receiving user input through an input device of the computing system selecting one or more binding elements from the plurality of binding elements;
creating a binding object from the selected one or more binding elements, the communication aspects corresponding to the selected binding elements being combined into a protocol, the binding object being an abstract representation of a communication protocol stack;
using the binding object, constructing a binding description to be used by a binding builder;
using the binding description to create a collection of metadata, the metadata describing the binding object and providing the abstract representation of the protocol stack that will implement the communication aspects at runtime;
creating a channel factory which uses the collection of metadata at runtime to generate the runtime communication channel, wherein the channel factory provides a handle referencing the runtime communication channel to the client upon requesting a channel, the runtime communication channel comprising a protocol which includes a transport aspect of the protocol stack and an encoding aspect of the protocol stack, the runtime communication channel accepting data or a message, implementing the communication aspects, formatting the message for transmission, and transmitting the message; and
creating a listener factory that accepts the runtime communication channel and de-multiplexes the communication aspects in accordance with the protocol stack in order to process the message at the service endpoint.

2. The method of claim 1, wherein a transport binding element and an encoding binding element are selected that correspond to a transport aspect and an encoding aspect, respectively;
wherein the transport aspect is one of UDP, HTTP, HTTPS, HTTPR, named pipes, TCP, SMTP, messaging queuing, messaging queuing integration, and wherein the encoding aspect is one of text, binary, MTOM.

3. The method of claim 1, wherein the collection of metadata is part of a WSDL document.

4. The method of claim 1, wherein the plurality of binding elements correspond to each of a transport aspect, an encoding aspect, a reliability aspect, a security aspect, a composite duplex aspect, a message format aspect, a context flow aspect, and a transaction flow aspect.

5. The method of claim 1, wherein the binding elements are fully extensible and customizable such that binding elements can be added, modified or removed without having to rewrite the application that presents the plurality of binding elements to the user.

6. The method of claim 1, wherein the binding elements are presented to the user in groups comprising a reliability group, a security group, a transport group, an encoding group and a miscellaneous group.

7. The method of claim 6, wherein the groups are fully extensible and pluggable, such that binding elements can be added, removed or modified to each group and the groups can be added, removed or modified.

8. The method of claim 1, wherein a composite duplex binding element is selected, and wherein two transport binding elements are selected.

9. A computer program product comprising one or more physical computer-readable storage device having encoded thereon computer-executable instructions for implementing a method of providing a developer with an automated way of constructing a binding object for use in creating a runtime communication channel in order to apply communication aspects on messages when transferring the messages between endpoints, the computer-executable instructions, when executed upon one or more processors, implementing the method of claim 1.

* * * * *